(12) United States Patent
Meredith et al.

(10) Patent No.: US 9,886,212 B2
(45) Date of Patent: Feb. 6, 2018

(54) MECHANISM FOR COPYING DATA IN MEMORY

(71) Applicant: IMAGINATION TECHNOLOGIES, LTD., Kings Langley (GB)

(72) Inventors: Jason Meredith, Hemel Hempstead (GB); Hugh Jackson, St. Albans (GB)

(73) Assignee: MIPS Tech, LLC, Santa Clara, CA (US)

(*) Notice: Subject to any disclaimer, the term of this patent is extended or adjusted under 35 U.S.C. 154(b) by 155 days.

(21) Appl. No.: 14/169,886

(22) Filed: Jan. 31, 2014

(65) Prior Publication Data

US 2014/0258623 A1 Sep. 11, 2014

(30) Foreign Application Priority Data

Mar. 6, 2013 (GB) .................................. 1304024.1

(51) Int. Cl.

| | |
|---|---|
| *G06F 12/08* | (2016.01) |
| *G06F 3/06* | (2006.01) |
| *G06F 12/0804* | (2016.01) |
| *G06F 12/10* | (2016.01) |
| *G06F 12/0802* | (2016.01) |
| *G06F 12/0811* | (2016.01) |

(52) U.S. Cl.
CPC ............ *G06F 3/065* (2013.01); *G06F 3/0604* (2013.01); *G06F 3/0683* (2013.01); *G06F 12/0802* (2013.01); *G06F 12/0804* (2013.01); *G06F 12/0811* (2013.01); *G06F 12/10* (2013.01)

(58) Field of Classification Search
CPC .......... G06F 12/02; G06F 12/08; G06F 13/28; G06F 3/265
See application file for complete search history.

(56) References Cited

U.S. PATENT DOCUMENTS 6,199,144 B1    3/2001  Arora et al.
2004/0049649 A1* 3/2004 Durrant ............... G06F 9/30032
                                                              711/165

(Continued)

FOREIGN PATENT DOCUMENTS

EP          1396792       3/2004
WO      WO 2013/097105    7/2013

OTHER PUBLICATIONS

Combined Search and Examination Report Under Sections 17 and 18(3), dated Sep. 27, 2013, as cited in GB1304024.1 (4pgs).

*Primary Examiner* — Charles Rones
*Assistant Examiner* — Han Doan
(74) *Attorney, Agent, or Firm* — Vorys, Sater, Seymour and Pease LLP; Vincent M DeLuca (57) ABSTRACT

An improved mechanism for copying data in memory is described which uses aliasing. In an embodiment, data is accessed from a first location in a memory and stored in a cache line associated with a second, different location in the memory. In response to a subsequent request for data from the second location in the memory, the cache returns the data stored in the cache line associated with the second location in the memory. The method may be implemented using additional hardware logic in the cache which is arranged to receive an aliasing request from a processor which identifies both the first and second locations in memory and triggers the accessing of data from the first location for storing in a cache line associated with the second location.

19 Claims, 6 Drawing Sheets

(56) References Cited

U.S. PATENT DOCUMENTS

2006/0075291 A1* 4/2006 Takahashi .......... G11B 20/1883
 714/6.32
2006/0087893 A1* 4/2006 Nishihara ........... G06F 12/0246
 365/145
2013/0111108 A1* 5/2013 Chen et al. .................. 711/103

* cited by examiner

MECHANISM FOR COPYING DATA IN MEMORY

BACKGROUND

In order to reduce the latency associated with accessing data stored in main memory, processors typically use a memory hierarchy which comprises one or more caches. There are typically two or three levels of cache, denoted L1, L2 and L3 and in some examples the first two caches (L1 and L2) may be on-chip caches which are usually implemented in SRAM (static random access memory) and the third level of cache (L3) may be an off-chip cache. In other examples, such as in a System on Chip (SoC), all the memory may be implemented in the same piece of silicon. The caches are smaller than the main memory, which may be implemented in DRAM, but the latency involved with accessing a cache is much shorter than for main memory, and gets shorter within the hierarchy as you get closer to the processor. As the latency is related, at least approximately, to the size of the cache, a lower level cache (e.g. L1) is typically smaller than a higher level cache (e.g. L2), using the convention that the L1 cache is the lowest level cache.

When a processor, or more particularly an ALU (arithmetic logic unit) within a processor, accesses a data item, the data item is accessed from the first level in the hierarchy where it is available (i.e. from the level closest to the processor where it is available). For example, a look-up will be performed in the L1 cache and if the data is in the L1 cache, this is referred to as a cache hit. If however, the data is not in the L1 cache, this is a cache miss and the next levels in the hierarchy are checked in turn until the data is found (e.g. L2 cache, followed by L3 cache, if the data is also not in the L2 cache). In the event of a cache miss, the data is brought into the cache. The traversing of the memory hierarchy which results from a cache miss in the lowest level cache (e.g. L1 cache) introduces latency.

There are many scenarios where a processor is required to copy data elements, and in particular memory ranges (i.e. a group of concurrent addressed memory locations which hold data elements), from one location in memory (i.e. main memory) to another. The latency associated with traversing the memory hierarchy (described above) reduces the speed with which this copying of data elements can be achieved and the speed with which memory ranges can be copied may be seen as a performance indicator (or benchmark) for the processor.

The embodiments described below are not limited to implementations which solve any or all of the disadvantages of known processors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An improved mechanism for copying data in memory is described which uses aliasing. In an embodiment, data is accessed from a first location in a memory and stored in a cache line associated with a second, different location in the memory. In response to a subsequent request for data from the second location in the memory, the cache returns the data stored in the cache line associated with the second location in the memory. The method may be implemented using additional hardware logic in the cache which is arranged to receive an aliasing request from a processor which identifies both the first and second locations in memory and triggers the accessing of data from the first location for storing in a cache line associated with the second location.

A first aspect provides a method of copying data from a first memory location to a second memory location comprising: accessing, by a cache, data stored at the first memory location; and storing the data in the cache in a cache line associated with the second memory location, wherein the first memory location and the second memory location are different locations within memory.

A second aspect provides a system comprising: a processor; and a cache, wherein the cache comprises a plurality of cache lines arranged to store data copied from memory and hardware logic arranged to access data stored at a first memory location and store the data in a cache line associated with a second memory location, wherein the first memory location and the second memory location are different locations within memory.

A third aspect provides a computer readable storage medium having encoded thereon computer readable program code for generating a cache comprising a plurality of cache lines arranged to store data copied from memory and hardware logic arranged to access data stored at a first memory location and store the data in a cache line associated with a second memory location, wherein the first memory location and the second memory location are different locations within memory.

A fourth aspect provides a computer readable storage medium having encoded thereon computer readable program code for generating a cache configured to perform the method described herein.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The following description relates to improved methods of copying data (or memory/data ranges) between memory locations. Hardware and/or software which may implement some or all of the method steps is also described.

As described above, processors often need to copy data elements from one memory location to another and the speed with which a processor can copy memory ranges is seen as a useful performance indicator. If the copying process involves traversing the memory hierarchy, significant latency is introduced and also this uses significant core resources (e.g. registers) and involves many read/write operations (e.g. multiple 32-bit read and writes to/from registers for each cache line which may, for example, be 32 or 64 Bytes in size). The term 'data range' may be used instead of memory range, where the data range refers to the group of data elements stored in a memory range.

One method of increasing the speed of copying memory ranges which has been proposed is to use Direct Memory Access (DMA) engines, which are specific devices which can be programmed with target and destination ranges and then fetch and return data in order to copy between locations. To increase speed, these engines may be placed close to the memory; however they require coherent controls so memory content updates may become visible in a controlled manner, preventing access to stale data and occupy space on the silicon.

In the methods described below, aliasing is used, such that a cache line is set with a fetch alias of another location. This enables one location in a cache (i.e. one cache line) to read and store (i.e. to copy) the content of one memory location (a first location in memory) and write data back to a different memory location (a second location in memory). After the initial data-fetch operation, the cache line operates as if the copied data had come from the second location and there may be no indication or record that the data which was copied originated from elsewhere (i.e. from the first location). These methods may be referred to as 'cache line aliasing'. This aliasing is described in more detail below with reference to FIG. 2 and contrasts to the standard operation of a cache which can be described with reference to FIG. 1.

Figure 1:
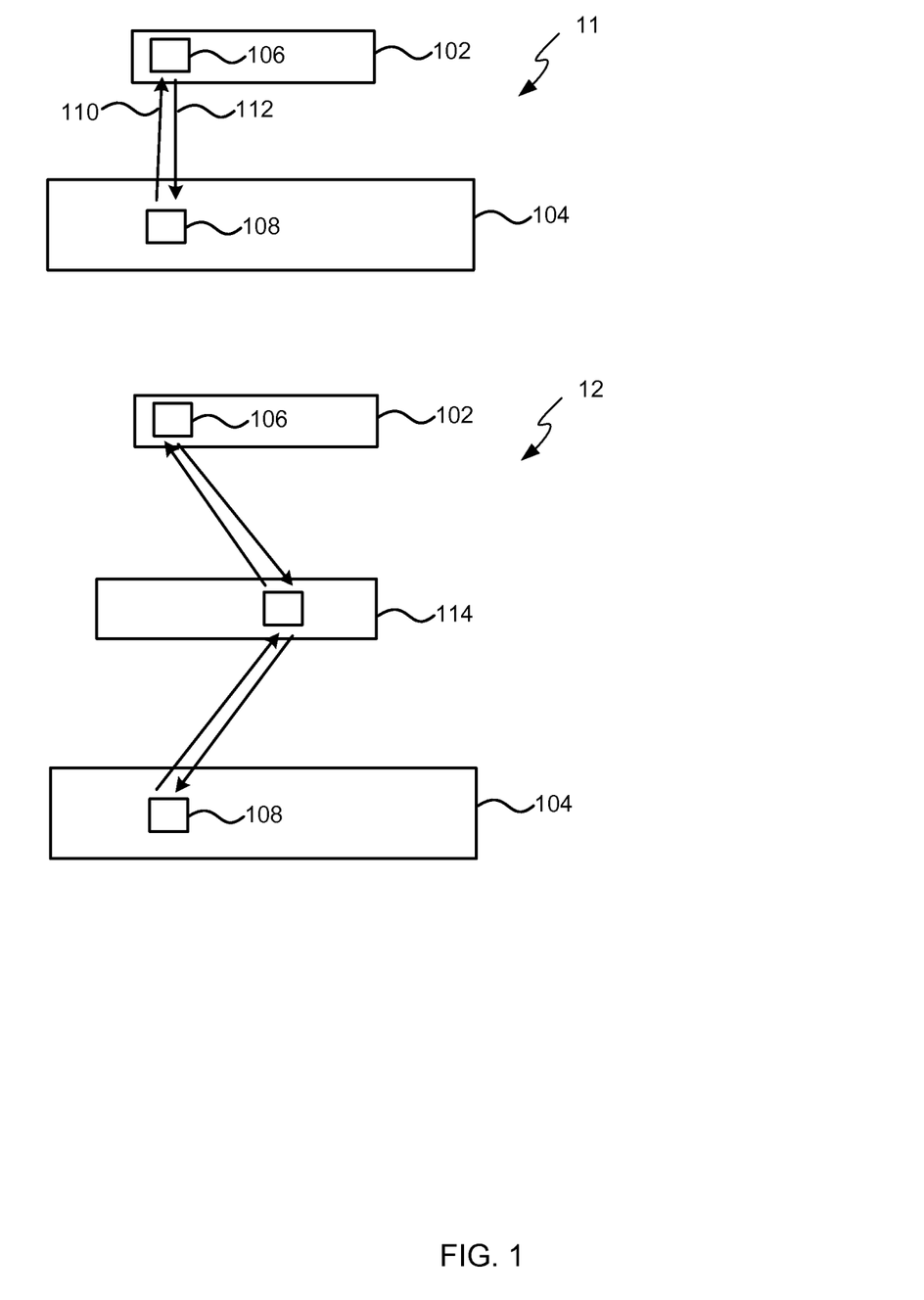
FIG. 1 is a schematic diagram showing operation of a cache.

As shown in FIG. 1, which is a schematic diagram illustrating standard operation of a cache, data is transferred between memory 104 and a cache 102 in fixed size blocks, which are referred to as cache lines. These cache lines may, for example, be 32 or 64 bytes in size and are bound to a start address which is aligned to its size. For example, a 64-byte cache line would be addressed with the lowest 6 address bits (of a byte address) as '0's, giving cache line addresses starting at 0x00, 0x40, 0x80, etc. A cache line 106 is used to store a copy of a block of data 108 from the memory 104 (arrow 110). Any changes that are made to that block of data are written first to the cache (i.e. to cache line 106) and then to the original block of data 108 in the memory 104 (arrow 112). Depending on the type of cache, the changes may be written immediately to memory 104 (a 'write-through' cache) or may be written when the block of data is evicted from the cache (for 'write-back' caches). As shown in FIG. 1, the relationship is symmetric in that the data is copied from and then written back to the same location (i.e. block 108) in the memory 104.

The upper diagram 11 in FIG. 1 shows the situation where the cache 102 is adjacent to the memory 104 in the memory hierarchy. The method can, however, be extended to the situation where there are one or more intermediate layers 114 in the memory hierarchy, as shown in the lower diagram 12. As shown in this lower diagram 12, the one to one mapping between a memory location (block 108) and its copy in the cache (cache line 106) is maintained.

Figure 2:
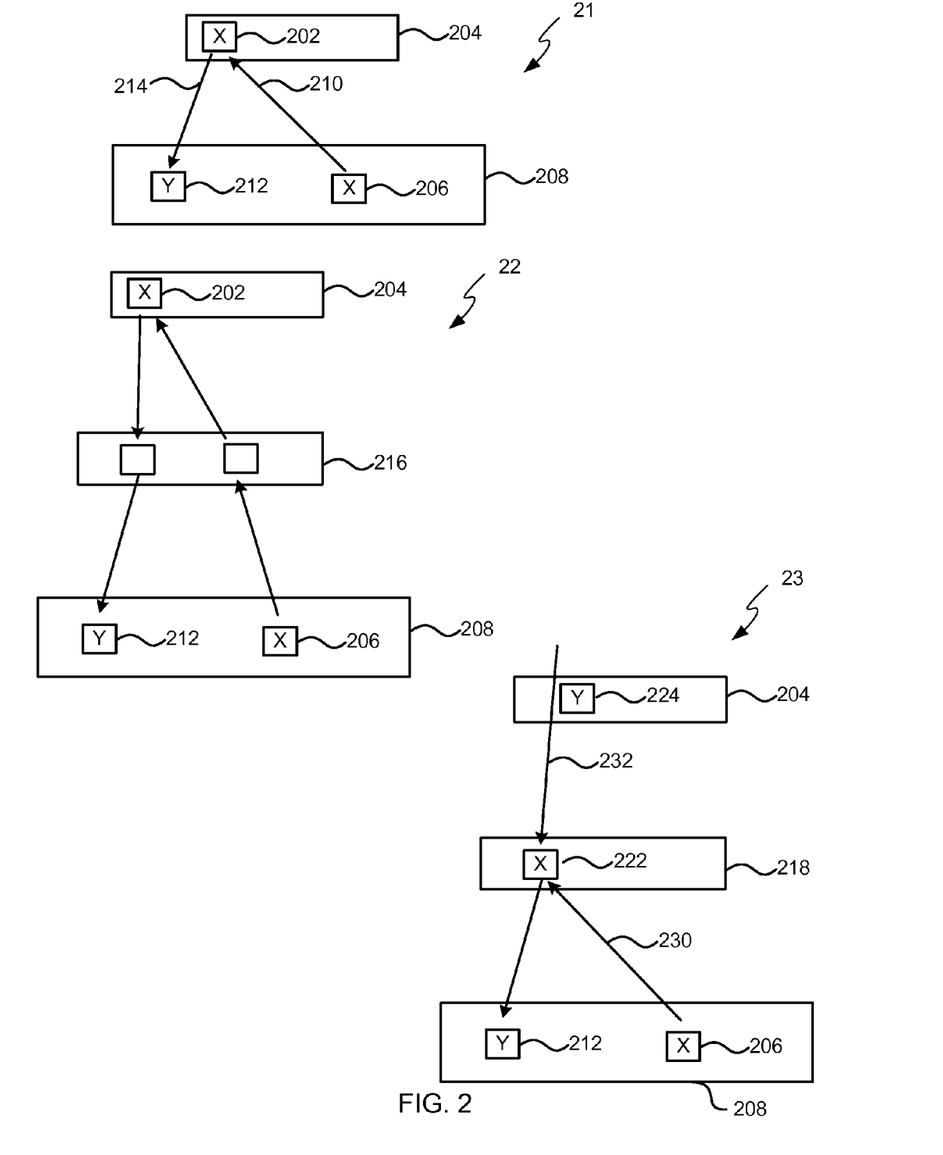
FIG. 2 shows example schematic diagrams of a cache which uses cache line aliasing.

The use of aliasing can be described with reference to the first diagram 21 in FIG. 2, which is a schematic diagram illustrating operation of a cache using cache line aliasing. As shown in FIG. 2 and in response to an aliasing command or operation (or other trigger), a cache line 202 in cache 204 copies the content of a first memory location 206 in memory 208 (arrow 210). Thereafter, the cache line 202 operates as if it contained the contents of a second memory location 212 (i.e. as if the cache line 202 is a copy of the second memory location 212 and not a copy of the first memory location 206) and provides the stored value ('X' in the example shown) when it receives a request for data from the second memory location (e.g. from a processor). The contents of the cache line 202 are also written back to the second memory location 212 (arrow 214, i.e. to overwrite 'Y' with 'X' in the example shown) using a standard mechanism (e.g. write-back or write-through depending on the type of cache), although as described below, the contents of the cache line 202 may be overwritten before the write-back occurs.

Figure 3:
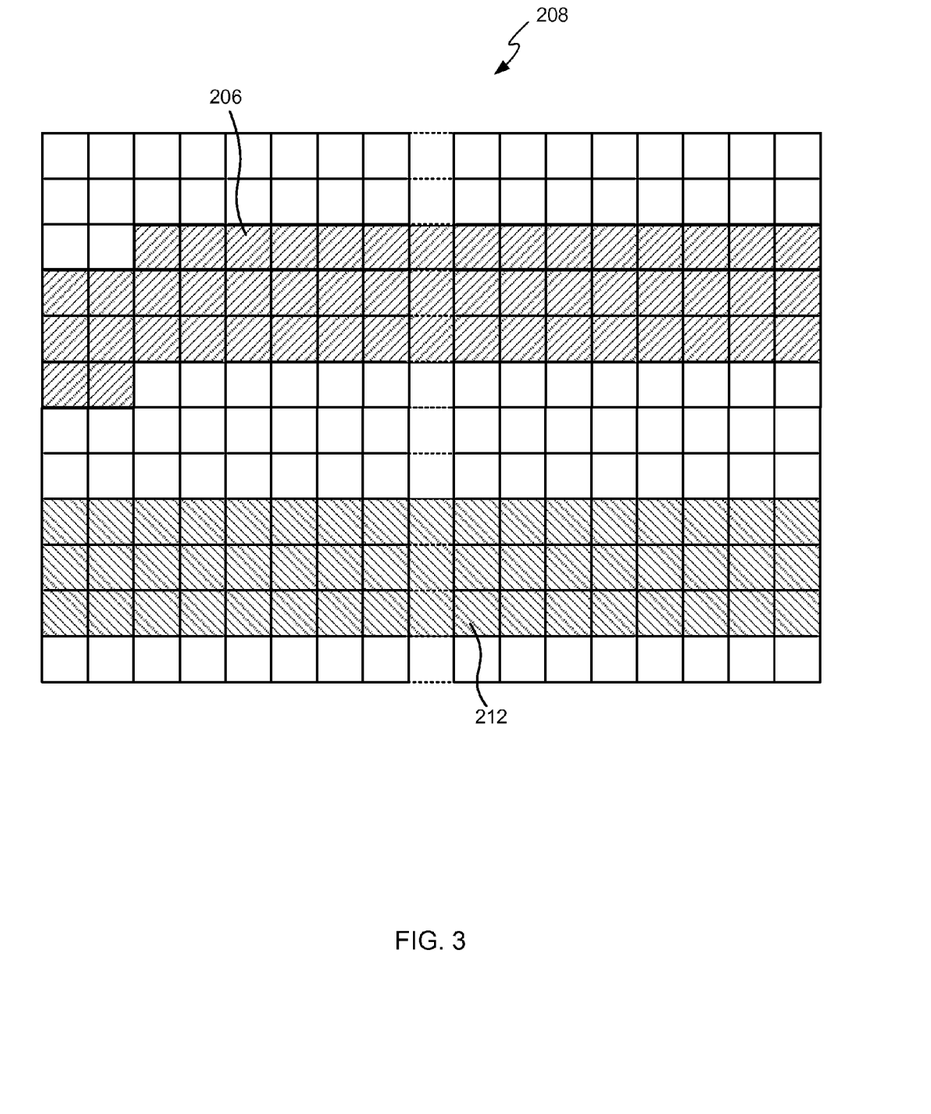
FIG. 3 is a schematic diagram showing main memory locations with example groupings of memory ranges into cached lines within a cache which uses cache line aliasing.

When using cache line aliasing, as described herein, the first memory location 206 is free from any memory alignment constraint. The size of the first memory location 206 is the same length as the second memory location 212 (i.e. a number of cache lines, dependent on the alias request produced); however, the starting address of the first memory location (from which the data is fetched) need not be aligned to the start of a cache line, but instead may be defined at any granularity including all the way down to a byte address. This is shown in the schematic diagram of memory 208 in FIG. 3, where the first memory location 206 is not aligned to the start of a cache line, unlike the second memory location 212 and the two memory locations 206, 212 are the same size.

Although the first diagram 21 shows the content of the first memory location 206 being retrieved from memory 208 (arrow 210), in a variation of that shown, if the content of this first memory location 206 has been cached elsewhere in the system (e.g. already in the cache 204 but in a cache line other than cache line 202), the content may be retrieved from there, rather than from memory 208.

Unlike the mechanism shown in FIG. 1, where aliasing is used the mechanism is not symmetric. Although, for the purposes of devices (e.g. a processor) reading from the cache, the cache line 202 appears to contain the contents of the second memory location 212, the data it contains is actually a copy of the data from another memory location (first memory location 206). This means that the copying of data from one memory location (the first memory location 206) to another (the second memory location 212) has been completed as soon as the data has been copied from the first memory location 206 into the cache line 202. It is not necessary for the data to be written back to the second memory location 212 in order to effect copying, because this write-back will happen subsequently, and before this happens (and in some cases, also after this happens), any device requesting the contents of the second memory location 212 will be served by the data stored in the cache line 202.

The first diagram 21 in FIG. 2 shows the situation where the cache 204 is adjacent to the memory 208 in the memory hierarchy. The method can, however, be extended to the situation where there are one or more intermediate layers 216 in the memory hierarchy, as shown in the second diagram 22. The method may also be implemented in any level of cache (e.g. L1 or L2 or L3) and/or in multiple levels of cache.

The third diagram 23 in FIG. 2 shows the situation where the alias is performed in a L2 cache 218 and the contents of the first memory location 206 are copied to a cache line 222 in the L2 cache 218 (arrow 230). Thereafter, the cache line 222 operates as if it contained the contents of a second memory location 212 (as described above in reference to the first diagram 21). In this example, there is an old cached copy of the contents of the second memory location 212 in the L1 cache (in line 224 and this is invalidated as part of the copy procedure (i.e. as part of the operation indicated by arrow 230). In this example, the aliasing request or command which triggers the aliasing operation is passed to the L2 cache (arrow 232).

In some examples, the alias command/request (or other trigger) may define the level at which the aliasing operation is performed or may indicate a preference relating to the level at which it is performed. The fastest copy mechanism would be to perform the operation in the cache closest to the memory (e.g. L3); however if the device requires use of the copied data it may be most efficient to perform the operation at the cache closest to the device (e.g. L1), as the copy is performed and the line fetched into L1 as part of the operation. It may also be simpler to implement in the L1 cache as a standard set of cache operations may be used to control visibility of the updated line (although the actual operations performed are dependent on the system). Implementation in the L2 cache may alternatively provide a balance between the effects of implementation in either L1 or L3.

Figure 4:
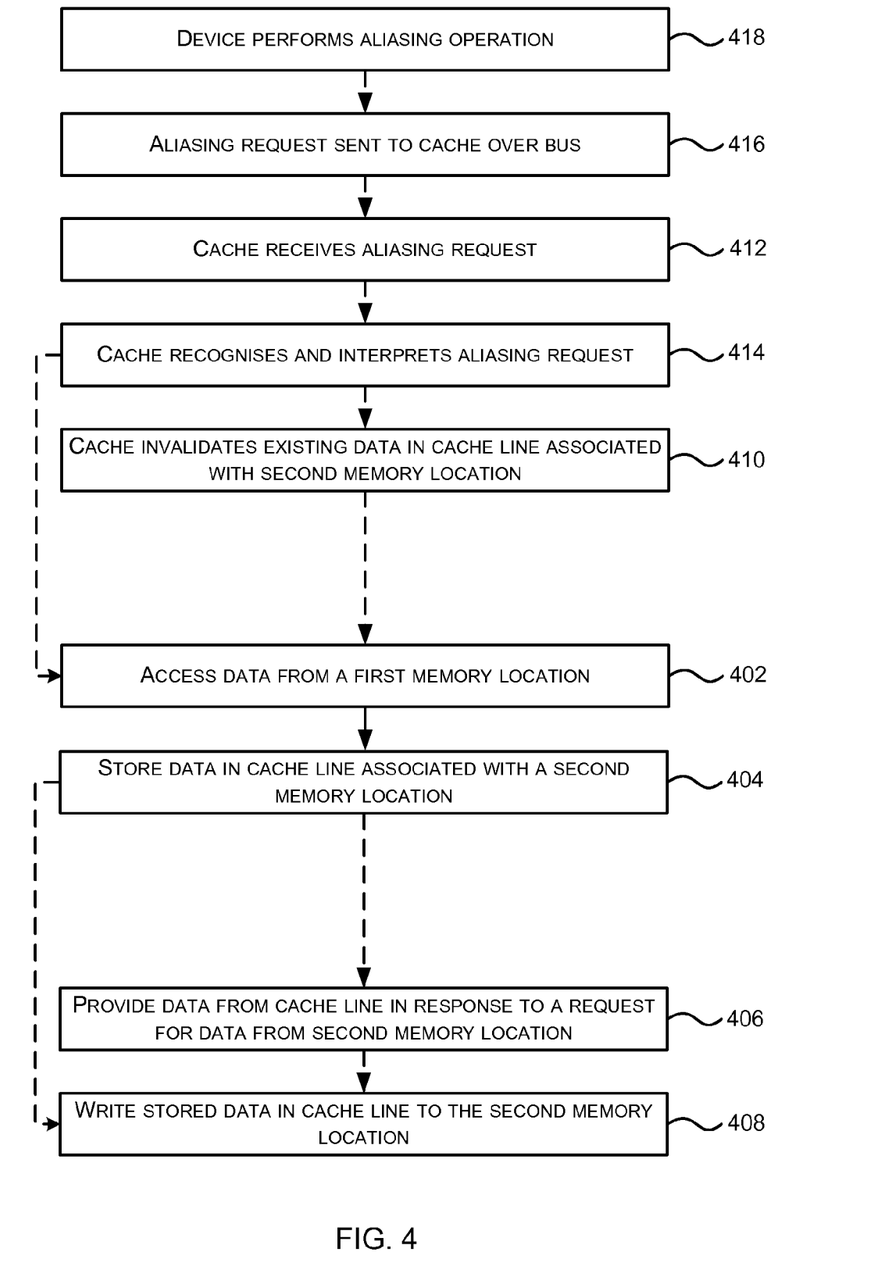
FIG. 4 shows an example method of copying data from one memory location to another memory location which is implemented using cache line aliasing.

FIG. 4 shows an example method of copying data from one memory location to another memory location which is implemented using cache line aliasing. According to this method, a cache (e.g. an L1 cache) accesses data from a first memory location (block 402) and stores it in a cache line which is associated with a second memory location and is not associated with the first memory location (block 404), where the first and second memory locations are different. These two method blocks correspond to arrows 210 and 214 in the first diagram 21 in FIG. 2. The method may also comprise one or more additional method blocks (e.g. any of blocks 406-418) and these additional (and optional) method blocks are described below.

As described above, if the cache receives a request for data from the second memory location, the data which is stored in the cache line associated with that second memory location is provided in response to that request (block 406). In situations where the request for data is received while the cache is still fetching the data (in block 402), the cache will not serve the data in response to the request until the data fetch has been completed (i.e. until block 402 has completed). It is not necessary for the mechanism to know that the data being fetched is not from the second memory location in order to wait for the fetch operation to finish, but instead the cache only need know that the data corresponding to the particular cache line (which is associated with the memory location identified in the request) is in the process of being fetched. This delay mechanism means that the cache does not provide stale or incorrect data in response to any request for data which is received after the aliasing process has been initiated (i.e. after block 402 has been triggered).

As also described above, the data in the cache line associated with the second memory location may be written back to the second memory location (block 408) and this operation may be implemented using standard cache mechanisms which may be dependent upon the type of cache (e.g. write-through or write-back). In some scenarios (and where the cache is a write-back cache), the value of the data stored in the cache line may be overwritten before it is written to the second memory location and in which case the new, updated value of the cache line may be written to the second memory location instead of the value copied from the first memory location. Where the cache is a write-through cache, the write-through occurs immediately once a cache line has been updated (in block 404). This is different from the standard write-through mechanism in which the writing of data through to memory only relates to writes being received from lower layers in the hierarchy (e.g. from the CPU or device).

In some examples, the cache line associated with the second memory location may already contain data (e.g. a copy of the data from the second memory location or an updated value) when the aliasing process is initiated (i.e. when block 402 is triggered). In such an example, the method may further comprise invalidating the data which is already stored in the cache line (block 410) before fetching the data from the first memory location. As described above with reference to the third diagram 23 in FIG. 2, this invalidation may also relate to lower levels of cache, where the aliasing operation is not being performed in the lowest level cache (e.g. when it is not being performed in the L1 cache). This invalidation may provide a further guarantee that old or incorrect data is not provided in response to a request for data from the second memory location or may be used instead of the delay mechanism described above.

Figure 5:
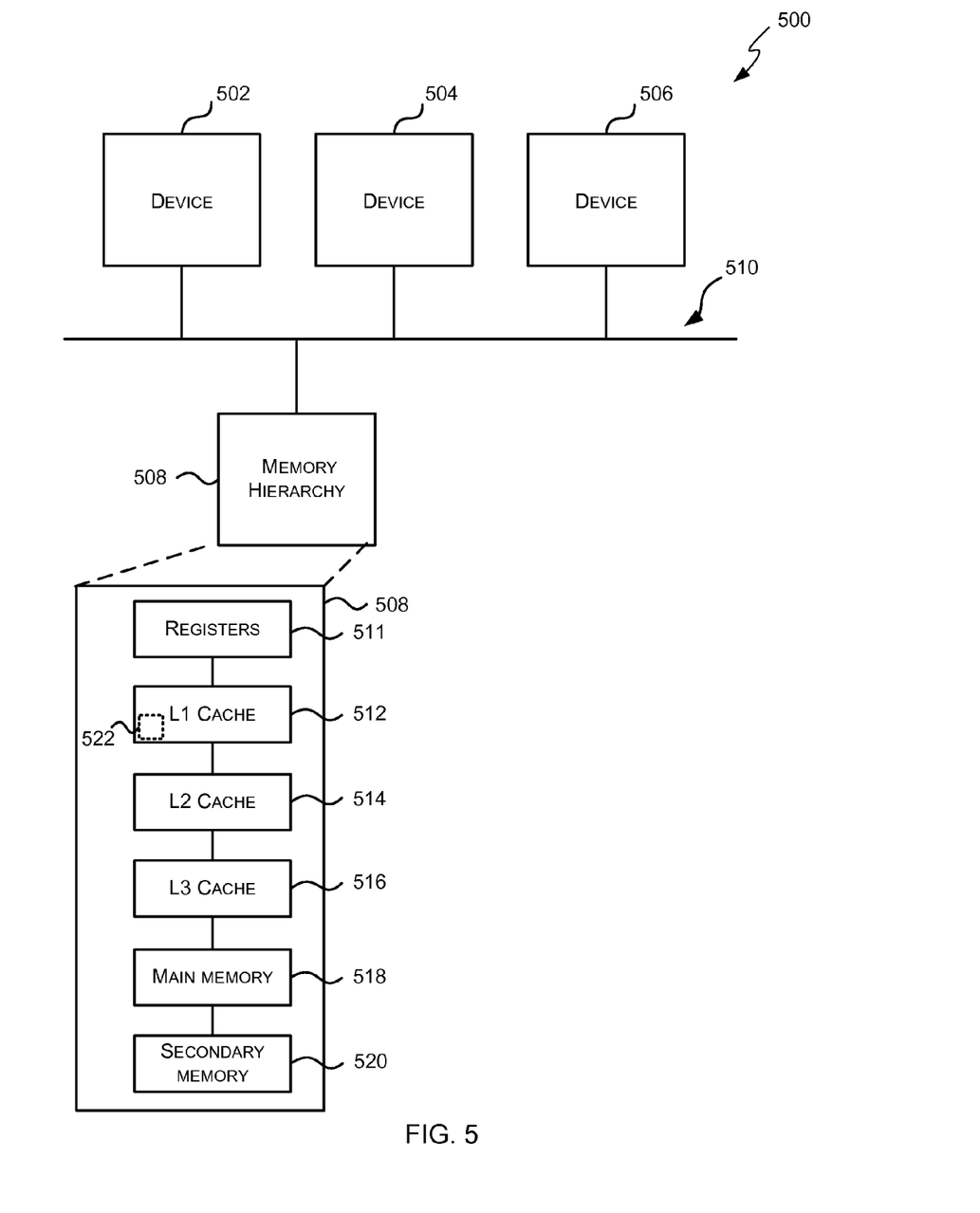
FIG. 5 is a schematic diagram of a system in which cache line aliasing may be implemented.

FIG. 5 shows a schematic diagram of a system 500 (such as a SoC) in which the methods described herein (e.g. as shown in FIG. 4) may be implemented. The system 500 comprises one or more devices 502, 504, 506 connected to a memory hierarchy 508 via a bus 510. Each of the devices 502, 504, 506 is capable of issuing requests for data from the memory hierarchy 508 over the bus 510. The devices 502, 504, 506 may, for example, comprise processors (e.g. physical or virtual processors) or sub-components of a processor (e.g. an ALU) and in systems which comprise more than one device, the devices 502, 504, 506 may all be the same type of device or they may be different types of device. The memory hierarchy 508 comprises a plurality of levels of memory and in this example comprises registers 511, three levels of cache 512, 514, 516, a main memory 518 and secondary memory 520. It will be appreciated that in other examples, the memory hierarchy 508 may comprise only a subset of the layers shown in FIG. 5 (i.e. some of the layers 511-520 shown in FIG. 5 may be omitted). It will be appreciated that where the system 500 is a SoC, some of the levels within the memory hierarchy 508 may be implemented off-chip or all the levels of the memory hierarchy 508 may be implemented on-chip. In an example, the system may comprise a processor connected to a cache by a bus but the main memory may be external to the system (e.g. where the system is a SoC, the main memory may be off-chip).

The cache which implements the methods described herein (e.g. the L1 cache 512 in the example of FIG. 5 and which corresponds to cache 204 in FIG. 2 and contains cache line 202) may comprise hardware logic 522 which is arranged to receive an aliasing request via the bus 510 (block 412 in FIG. 4) and to recognize and interpret that request (block 414). This hardware logic 522 causes (as a consequence of receiving the aliasing request) the cache to allocate a line associated with the second memory location and further causes the data to be accessed from the first memory location (in block 402) instead of the second memory location. The hardware logic 522 may further ensure that coherency and consistency mechanisms are correctly adhered to for both memory locations.

The aliasing request which is transmitted over the bus 510 to the cache (block 416), e.g. the L1 cache 512 in the example shown in FIG. 5, may be generated by a device 502, 504, 506 when it performs an aliasing operation or command (block 418). This aliasing request may trigger the aliasing operation (blocks 402 and 404) which is performed by the cache. A new instruction may be used to generate the aliasing request, where this new instruction contains the necessary fields (e.g. the first and second memory locations and in some cases additional information). Alternatively, this information may be provided by a set of internal register locations which access logic that can issue the alias request following a series of received commands through the register interface (and this would not require a new instruction).

The aliasing command and/or request identifies both the first and second memory locations and may, in some examples, provide additional options such as the cache level in which the aliasing operation is to be performed. In an example, the aliasing command or request may be of the form: Alias (y(x)), which triggers the cache to load the value of memory location x (e.g. memory location 206 in FIG. 2) into a cache line associated with memory location y (e.g. cache line 202 in FIG. 2). Although the aliasing request or command is described herein as a single request/command, it will be appreciated that the aliasing request may comprise a series of requests which together constitute an aliasing request.

Figure 6:
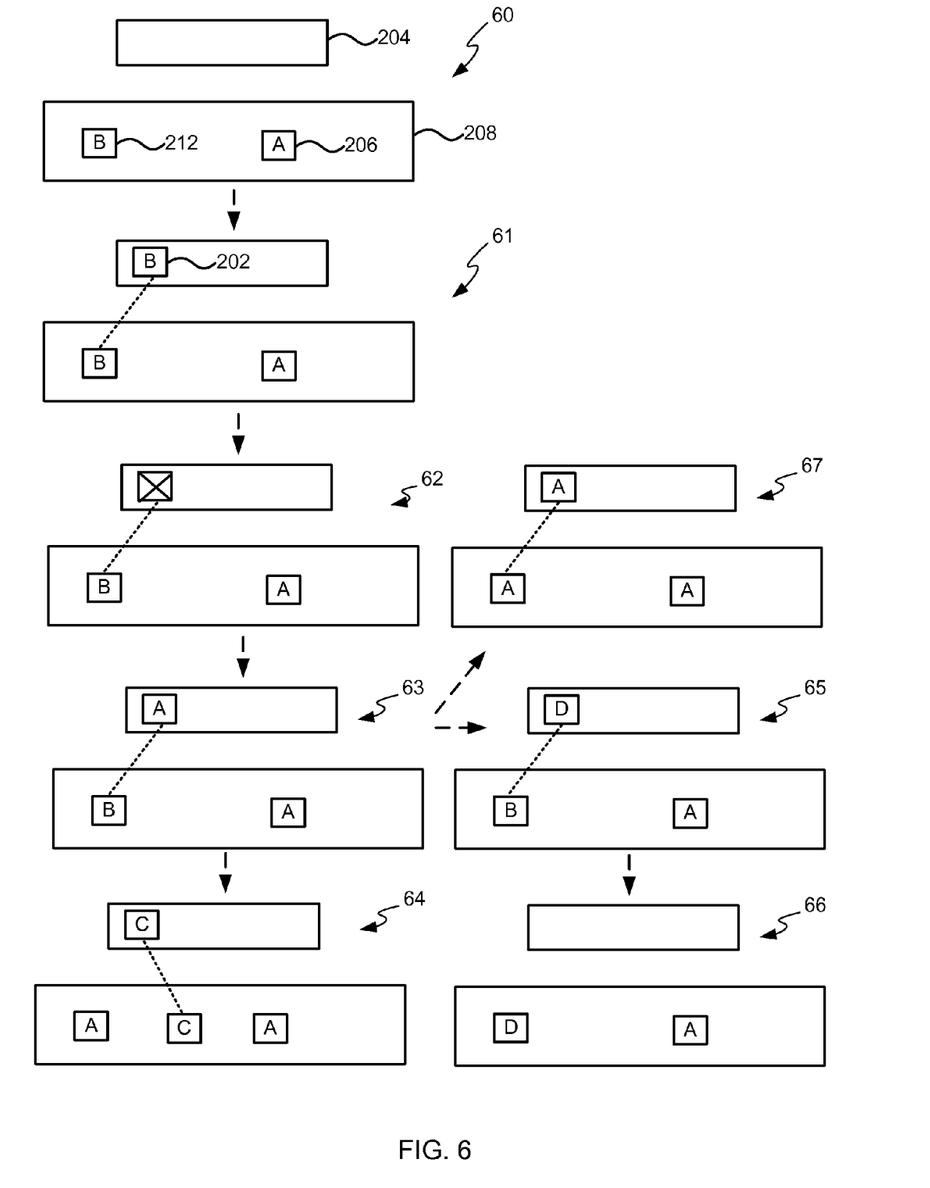
FIG. 6 shows a series of example scenarios which may occur when cache line aliasing is used.

Possible example sequences of scenarios may be described with reference to FIG. 6. Initially, as shown in diagram 60, the first memory location 206 contains a value A and the second memory location 212 contains the value B. When a device requests data from the second memory location, a cache miss occurs (in cache 204) as the data is not already stored there, and as a consequence, the data from the second memory location 212 (B) is fetched and stored in an associated cache line 202, as shown in diagram 61 (where the association between a cache line and a memory location is indicated by a dotted line). Any following request for data from the second memory location will return the value B from the cache (unless the data is updated).

If an aliasing request is received by the cache (e.g. of the form 'Alias (212(206))' using the notation above and the reference numerals from the figures), the existing value in the cache line 202 associated with the second memory location may be invalidated, as shown in diagram 62. At this point, if a request for the data from the second memory location is received, no data will be returned until a new value has been fetched from memory.

Diagram 63 shows the situation after the aliasing operation has been completed. The cache line associated with the second memory location now contains value A and any subsequent request for data from the second memory location will return the value A from the cache (unless the data is updated). The copying of data from the first memory location to the second memory location has now been effected despite the fact that the second memory location still contains the original value B.

At some point, the value in the cache line associated with the second memory location may be written back to the second memory location. In one example, this may occur when the data in the cache line is evicted (e.g. due to a cache conflict). In this case, the cache line which was previously associated with the second memory location is now associated with another memory location (as indicated by the dotted line) as shown in diagram 64.

In an alternative scenario, the value in the cache line associated with the second memory location may be overwritten, as shown in diagram 65, and this updated value D may be written back to the second memory location subsequently, for example when the data in the cache line is evicted, as shown in diagram 66. As described above, where the cache is a write-through cache, rather than a write-back cache, the updating of the value in the second memory location may alternatively happen as soon as the value in the cache line associated with the second memory location is updated e.g. as shown in diagram 67.

The methods described above relate to copying a single memory block to a cache line. In order to copy a memory range, the methods described above may be modified to copy multiple memory blocks to multiple cache lines. In order to implement this, a series of alias requests may be used (e.g. each one relating to a single cache line) and/or the alias request may include a 'length' field or similar which indicates the number of cache lines to be copied, with the starting addresses of the first and second memory locations provided in the request; these would increment together to perform a copy of the defined number of blocks. The method then proceeds as described above, with data accessed from a series of first memory locations (as in block 402) and stored in a number of cache lines, each cache line associated with one of a series of second memory locations (as in block 404) and not associated with the series of first memory locations.

Using the cache line aliasing technique described above, it is possible to increase the speed of copying memory ranges and also to make the copying process much more efficient (e.g. it uses fewer resources within the system). For example, unlike the DMA approach (described above), the need to use an external device (e.g. a DMA engine) to perform the copying is reduced. Furthermore, unlike the conventional solution it reduces the need for the data being copied to propagate all the way up the memory hierarchy and the down the memory hierarchy again, does not require the same data item to be stored twice in the cache (in the conventional approach the same data item would be stored in both a cache line associated with the first memory location and a cache line associated with the second memory location) and does not use the registers (the conventional approach involves multiple 32-bit read and writes to/from the registers which hold data during the copy procedure). The methods described above may provide a reduction to a single request operation in order to perform a copy of a cache line or series of lines.

The cache line aliasing technique described above may be implemented using only a small amount of additional silicon area (for hardware logic 522 in FIG. 5) and thereby provides a valuable feature addition at a small systems cost. It removes the requirement to provide DMA engines to handle such tasks and as a result reduces the system design complexity. Using the cache line aliasing technique described above, cache coherency operations are upheld to allow inherently coherent operation (which may not always be the case where a DMA engine is used). In solutions using DMA engines, it may be necessary to implement an additional mechanism at the cache so that data is not provided by the cache while the DMA engine is in the process of copying data. Using cache line aliasing, however, the method is atomic at the cache—as soon as the aliasing request is received, any old data in the cache line is not provided in response to a request and the only delay in serving data is a result of memory latency while the new value is fetched from memory.

Where a cache line is described herein as being associated with a particular memory location, that associated memory location is the memory location to which the data stored in the particular cache line is written back to (e.g. using a standard mechanism such as write-back or write through). As described above, data from a first memory location is stored in a cache line which is associated with a second (and different) memory location and is not associated with the first memory location. This has the effect that the data from the first memory location is copied (through the process of writing the data back to the memory) to the second memory location.

The term 'processor' and 'computer' are used herein to refer to any device, or portion thereof, with processing capability such that it can execute instructions. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method of accessing data from a first memory location to be copied to a second memory location of a memory, comprising:
   accessing, by a cache, data stored at the first memory location; and
   storing the data in the cache in a cache line associated with the second memory location and not associated with the first memory location, so that in response to a request for data stored at the second memory location, the cache returns the data stored in the cache line as the data stored in the second memory location when the data is stored in memory only in the first memory location, wherein the first memory location and the second memory location are different locations within the memory.

2. The method according to claim 1, further comprising: writing the stored data in the cache line to the second memory location.

3. The method according to claim 1, further comprising: receiving, at the cache, an aliasing request from a processor, the aliasing request identifying the first and second memory locations and wherein the accessing of the data stored at the first memory location is triggered by receipt of the aliasing request.

4. The method according to claim 3, further comprising: generating, at a processor, the aliasing request; and transmitting the aliasing request to the cache.

5. The method according to claim 1, wherein the cache is an L1 cache.

6. The method according to claim 1, wherein the first memory location is free from any memory alignment constraint.

7. The method according to claim 1, wherein the first memory location and the second memory location are the same size.

8. The method according to claim 1, wherein the first memory location comprises a first memory range and the second memory location comprises a second memory range.

9. The method according to claim 1, wherein the first memory location and the second memory location are different locations within a main memory.

10. A system comprising:
    a processor; and
    a cache, wherein the cache comprises a plurality of cache lines arranged to store data copied from a memory and hardware logic arranged to access data stored at a first memory location and store the data in a cache line associated with a second memory location and not associated with the first memory location, wherein the cache is configured, in response to a request for data stored at the second memory location, to return the data stored in the cache line as the data stored in the second memory location when the data is stored in the memory only in the first memory location, wherein the first memory location and the second memory location are different locations within the memory.

11. The system according to claim 10, wherein the cache is arranged to provide the data stored in the cache line in response to a request for data stored in the second memory location.

12. The system according to claim 10, wherein the cache is arranged to write the stored data in the cache line associated with the second memory location to the second memory location.

13. The system according to claim 10, wherein the processor is arranged to generate an aliasing request and transmit the aliasing request to the cache, wherein the aliasing request identifies the first and second memory locations and wherein the hardware logic is further arranged to trigger the accessing of the data stored at the first memory location on receipt of the aliasing request from the processor.

14. The system according to claim 10, wherein the cache is an L1 cache.

15. The system according to claim 10, further comprising the memory containing the first and second memory locations.

16. The system according to claim 10, wherein the first memory location comprises a first memory range and the second memory location comprises a second memory range.

17. A non-transitory computer readable storage medium having encoded thereon computer readable program code for generating a cache comprising a plurality of cache lines arranged to store data copied from a memory and hardware logic arranged to access data stored at a first memory location and store the data in a cache line associated with a second memory location and not associated with the first memory location, wherein the cache is configured, in response to a request for data stored at the second memory location, to return the data stored in the cache line as the data stored in the second memory location when the data is stored in memory only in the first memory location, wherein the first memory location and the second memory location are different locations within the memory.

18. A non-transitory computer readable storage medium having encoded thereon computer readable program code for generating a cache configured to perform the method of claim 1.

19. The method according to claim 1, wherein said storing the data in the cache comprises storing the data in the cache in a cache line associated with the second memory location and not associated with the first memory location, so that in response to a request for data stored at the second memory location, the cache line returns the data stored in the cache line as the data stored in the second memory location when the data is stored in the memory only in the first memory location and before the data is stored in the second memory location.

* * * * *